June 28, 1932.  K. F. PIETZSCH  1,864,757

FILTER

Original Filed June 7, 1928

Kurt F. Pietzsch
INVENTOR.

BY Robert Ames Norton

ATTORNEY

Patented June 28, 1932

1,864,757

UNITED STATES PATENT OFFICE

KURT F. PIETZSCH, OF PITTSBURGH, PENNSYLVANIA, ASSIGNOR, BY MESNE ASSIGNMENTS, TO NATIONAL ANILINE & CHEMICAL COMPANY, INC., OF NEW YORK, N. Y., A CORPORATION OF NEW YORK

FILTER

Original application filed June 7, 1928, Serial No. 283,493. Divided and this application filed March 23, 1929. Serial No. 349,488.

This invention relates to filters and more particularly to filters capable of complete enclosure during operation.

Nutsch filters in which solids are separated from liquids by filtering through a screen or perforated plate are usually operated so as to compact the cake, especially when vacuum filtration is used, and to aid the filtering action by mechanical pressure on the cake. A very simple type of apparatus is used in which compacting of the cake is effected manually. This type of filter is very satisfactory where filtration takes place at moderate temperatures with solvents such as water which do not give off inflammable or toxic vapors and where loss of solvent by evaporation is of minor importance owing to its low cost. Where more expensive solvents are used and especially where it is necessary to use solvents or operate under conditions where dangerous vapors are evolved, as for example when organic solvents are used, it is desirable to enclose the filter during filtration and in such cases it is a comparatively difficult matter to effect a satisfactory nutsch action.

The present invention is directed to a design of nutsch filter which can be operated completely enclosed during the whole filtration and during removal of the cake. The filter of the present invention also possesses the advantage that a very even and gradually regulatable compacting is obtained and a very efficient mechanical discharge is provided.

In the filter of the present invention a screen is mounted in a closed chamber as in an ordinary closed filter and rotating means are provided which move over the cake to compact it and to agitate the slurry above it. In one position, usually in one direction of rotation, the rotating device smooths and compacts the cake; in another position, usually when rotated in the reverse direction, the device acts as a scraper which scrapes off the cake, discharging it either outwardly or inwardly to suitably discharge openings. The dual function performed by the rotating means constitutes the essential and most important advantage of the present invention.

While the filters embodying the principles of the present invention are applicable to the filtration of any material which can be screen filtered, they are particularly important for filtration of mixtures where evaporation of the solvent is to be avoided, as is the case with numerous organic solvents. The invention will be described in connection with filtration of a slurry of crude or partly purified anthracene and furfural and the description will also bring out a further advantage of the present invention, permitting effective washing in the filter without loss of wash liquid by vaporization. In the description, as applied to a representative process, the washing is carried out by means of benzol, illustrating a solvent which is volatile and produces vapors which are both toxic and highly inflammable. It should be understood, of course, that while the filter of the present invention is peculiarly adapted to the filtration of furfural-anthracene mixtures, it is applicable to all other types of mixtures suitable for screen filtration and the description merely illustrates a representative embodiment.

In the drawing

Figure 1:
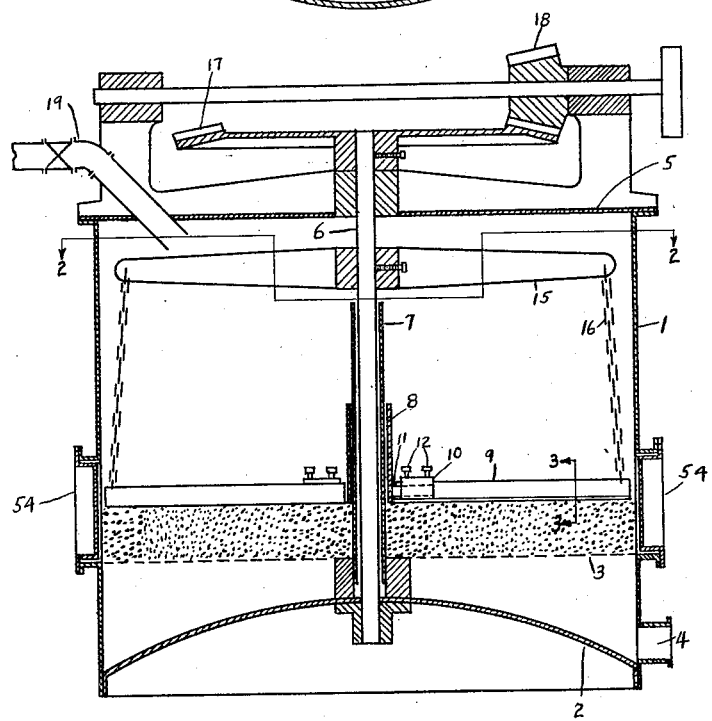
Fig. 1 is a vertical section through a closed filter showing a flexibly driven smoothing and plowing means.
Figure 3:
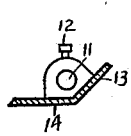
Fig. 3 is a detail vertical section of the plowing mechanism at right angles to Fig. 1 taken along the line 3—3.

In the construction shown in Fig. 1, the filter consists of a shell 1, a bottom piece 2 which forms with the screen 3 a filtrate chamber provided with exit pipe connection 4. A top cover 5 is provided through which the valved slurry intake pipe 19 and a rotating shaft 6 extend. This shaft is centrally located and turns in bearings in the bottom piece 2. The shaft turns in a sleeve 7 and is rotated by means of a gear 17, meshing with a pinion 18 driven from any suitable source of power, which can be reversed. A pair of arms 15 are firmly fastened to the shaft 6 by means of set screws or other suitable fastenings and rotate with it. These arms are positioned below the top piece 5 and are provided at their ends with chains 16 somewhat longer than the vertical distance between the arms and screen 3. The other ends of the chains are connected to the ends of a rotary sledge 9 consisting of two sledge arms which are provided at their ends with drilled bosses 10 into which studs 11 fit and are held in adjustment by set screws 12. These studs 11 are rigidly mounted in a sleeve 8 which is capable of free rotation around and longitudinal movement on the sleeve 7. The sledge arms are in the form of an obtuse angle, the shorter side of the angle 13 acting as sledge runner and the long side 14 acting as a plow.

Figure 2:
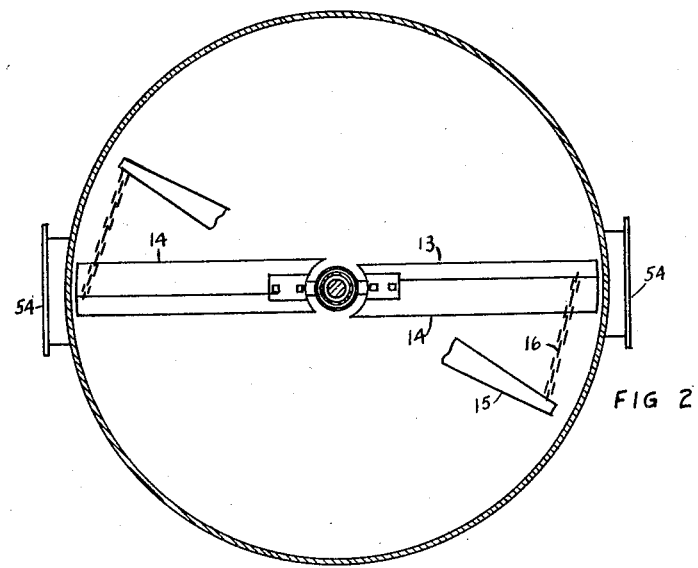
Fig. 2 is a horizontal section of Fig. 1 along the line 2—2.

In operation the sledge is set at the correct angle and held by the set screws 12. A slurry of furfural and anthracene flows in through the pipe 19 and the shaft 6 begins to rotate in a counter clock-wise direction when looking down on the filter. The arms 15 are somewhat in advance of the sledge arms 9 because of the length of the chains 16 and draw the sledge over the filter. The movement of the sledge keeps the slurry agitated and as the anthracene cake builds up the sledge rides over it, smoothing and compacting the cake in a uniform and very effective manner. When sufficient cake has been built up the flow of slurry is stopped, preferably the last of the solvent sucked out by means of a vacuum applied to the filter or if desired the filtration can be continuously effected under a vacuum. When the last of the solvent is removed mechanically, benzol can be introduced through the pipe 19, is uniformly distributed over the cake by the rotating sledge and serves to displace the more expensive furfural, also washing the cake and removing some remaining phenanthrene. When the cake has been sucked as dry as possible after the benzol wash, the rotation of the arms 15 is reversed and the discharge openings 54 are uncovered. The clock-wise rotation of the arms, which is shown in Fig. 2, reverses the direction of the rotation of the sledge arms and causes the edges of the plow faces 14 to dig into the cake, shaving off successive portions and discharging them through the openings 54 until all of the cake has been so discharged. If desired the edge of the side 14 can be somewhat tapered in order to improve the discharging action. When the cake has been entirely discharged the rotation of the arms is reversed, the discharge openings are closed and the filter is ready to filter a second batch.

It should be noticed that all of the operation was carried out in a completely closed apparatus and there is, therefore, no loss of expensive, toxic, or inflammable vapors during operation for, of course, the discharge openings 54 may be connected to pipes providing a closed discharge where this is desirable. Maximum economy of solvents, complete absence of fire and toxic vapor hazard and a very efficient nutsch filter is provided. The apparatus is simple, rugged, and operates for long periods of time without attention.

The invention has been described in connection with a typical, practical filter device and in conection with a representative filtering process. It should be understood that the drawing is to a large extent diagrammatic in nature, the exact structural design of many of the component parts with the exception of the actual plowing and smoothing mechanism being merely shown conventionally as, of course, the design of filter structure, wash pipes, gears, shafts, discharging pipes and the like can be varied to suit particular conditions and any suitable type of structure may be used. Where hot filtration is desired the filter can be jacketed, lagged or otherwise suitably heat insulated. The present invention is applicable to all filters under ordinary pressure, vacuum filters, pressure filters or combination of vacuum and pressure. The structural design can be modified within wide limits without departing from the scope of the invention and it should be understood that the invention is in no way limited to the precise details illustrated in the drawing which are merely designs of representative embodiments of the principles of the present invention.

The filter of the present invention has been described in connection with closed filtrations, a field in which it is preeminently adapted and possesses peculiar advantages. It should be clearly understood that the advantages of uniform and effective compacting and mechanical discharge may, however, be enjoyed in an open filter where the solvent used is of such a nature as to make this type of filter satisfactory. The only change in construction of course, consists in the elimination of the top cover as would be clear to any engineer.

This application is a division of my copending application Serial No. 283,493, filed June 7, 1928.

What is claimed as new is:

1. A filter comprising in combination a filter chamber having a screened bottom, at least one discharge opening in the side of the chamber immediately above the screen, a vertical shaft centrally mounted in said chamber and adapted to be rotated in either direction, arms rigidly connected to said shaft and rotating therewith, a polyarmed sledge member capable of free rotation about the vertical shaft and longitudinal movement thereon, flexible connections between the rotating arms and the sledge arms, said sledge being so adjusted as to compact any cake formed on the filter during one direction of rotation and to plow said cake outwardly through said discharge opening on the reverse direction of rotation and means for introducing a mixture of solids and liquids into the filter chamber.

2. A filter according to claim 1 in which the chamber is completely enclosed and means are provided for introducing the solids and liquids without opening the chamber to the atmosphere.

Signed at Pittsburgh, Pennsylvania, this 8th day of March, 1929.

KURT F. PIETZSCH.